(12) United States Patent
Lee et al.

(10) Patent No.: US 11,347,370 B2
(45) Date of Patent: *May 31, 2022

(54) METHOD AND SYSTEM FOR VIDEO RECORDING

(71) Applicant: LINE Corporation, Tokyo (JP)

(72) Inventors: Seungjun Lee, Seongnam-si (KR); Jihwan Kim, Seongnam-si (KR)

(73) Assignee: LINE Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/720,794

(22) Filed: Dec. 19, 2019

(65) Prior Publication Data

US 2020/0125237 A1 Apr. 23, 2020

Related U.S. Application Data

(63) Continuation of application No. 15/668,024, filed on Aug. 3, 2017, now Pat. No. 10,585,551.

(30) Foreign Application Priority Data

Aug. 12, 2016 (KR) .......................... 10-2016-0102939

(51) Int. Cl.
*G06F 3/04815* (2022.01)
*H04N 21/81* (2011.01)
(Continued)

(52) U.S. Cl.
CPC ......... *G06F 3/04815* (2013.01); *G06Q 50/01* (2013.01); *H04L 51/046* (2013.01);
(Continued)

(58) Field of Classification Search
CPC .... H04N 21/81; H04N 21/218; H04N 21/231; H04N 21/262; H04N 21/414;
(Continued)

(56) References Cited

U.S. PATENT DOCUMENTS 6,378,129 B1 * 4/2002 Zetts ................. H04L 29/06027
348/E5.008
8,890,954 B2 * 11/2014 O'Donnell ......... H04N 5/23206
348/143

(Continued)

FOREIGN PATENT DOCUMENTS

JP 2006-87095 A 3/2006
JP 2014-239397 A 12/2014
(Continued)

OTHER PUBLICATIONS

DB Best Chronicles, "Mobile Video Processing on the Fly", May 30, 2014, pp. 1 of 3.
(Continued)

*Primary Examiner* — James N Fiorillo
(74) *Attorney, Agent, or Firm* — Harness, Dickey & Pierce, P.L.C.

(57) ABSTRACT

Provided are methods and systems for video recording. The video recording method may include capturing a preview image, using a camera included in the electronic device, based on a set frame rate and in response to the electronic device entering an image photographing mode; storing the captured preview image; applying at least one time-fake effect among a plurality of set time-fake effects to the stored preview image; and creating a video file of a set format by encoding the preview image after the applying the at least one time-fake effect.

21 Claims, 10 Drawing Sheets

(51) Int. Cl.
*H04N 21/4223* (2011.01)
*H04N 21/414* (2011.01)
*H04N 21/433* (2011.01)
*H04N 21/854* (2011.01)
*H04N 19/119* (2014.01)
*H04N 19/137* (2014.01)
*H04N 19/142* (2014.01)
*H04N 19/177* (2014.01)
*G06Q 50/00* (2012.01)
*H04L 51/046* (2022.01)
*H04L 51/52* (2022.01)
*H04L 67/06* (2022.01)
*H04L 67/51* (2022.01)
*H04L 67/306* (2022.01)

(52) U.S. Cl.
CPC ........... *H04L 51/32* (2013.01); *H04N 19/119* (2014.11); *H04N 19/137* (2014.11); *H04N 19/142* (2014.11); *H04N 19/177* (2014.11); *H04N 21/41407* (2013.01); *H04N 21/4223* (2013.01); *H04N 21/4334* (2013.01); *H04N 21/8153* (2013.01); *H04N 21/854* (2013.01); *H04L 67/06* (2013.01); *H04L 67/16* (2013.01); *H04L 67/306* (2013.01)

(58) Field of Classification Search
CPC ............... H04N 21/433; H04N 21/854; H04N 21/2181; H04N 21/2743; H04N 21/4223; H04N 21/4334; H04N 21/8153; H04N 21/23109; H04N 21/26291; H04N 21/41407; H04N 19/119; H04N 19/137; H04N 19/142; H04N 19/177; H04N 5/76; H04N 5/222; H04N 5/225; H04N 5/232; H04N 5/3877; H04N 5/23222; H04N 5/262; G06Q 50/00; G06Q 50/01; G06F 3/0481; G06F 3/04815; G06F 1/1626; G06F 9/44505; G06F 16/739; G06F 16/9535; G06F 8/65; G06F 11/1433; H04L 51/04; H04L 51/32; H04L 12/58; H04L 67/06; H04L 67/16; H04L 67/306; H04L 29/08; H04L 29/08549; H04L 41/50; H04L 61/30; H04H 20/57; H04H 60/25; H04H 60/27; H04W 4/00
USPC ....................................................... 709/206
See application file for complete search history.

(56) References Cited

U.S. PATENT DOCUMENTS

| | | | | |
|---|---|---|---|---|
| 9,225,904 | B2* | 12/2015 | Furuya | H04N 5/232935 |
| 2001/0028399 | A1* | 10/2001 | Conley | H04N 5/262 |
| | | | | 348/239 |
| 2006/0263037 | A1* | 11/2006 | Gilley | H04N 5/7605 |
| | | | | 386/232 |
| 2007/0143800 | A1* | 6/2007 | Salomons | H04N 7/163 |
| | | | | 725/74 |
| 2010/0118150 | A1* | 5/2010 | Boland | H04N 5/2259 |
| | | | | 348/207.1 |
| 2011/0043639 | A1* | 2/2011 | Yokohata | H04N 5/23222 |
| | | | | 348/169 |
| 2012/0163777 | A1* | 6/2012 | Murakami | H04N 9/8205 |
| | | | | 386/328 |
| 2012/0281127 | A1* | 11/2012 | Marino | G06F 3/0236 |
| | | | | 348/333.01 |
| 2012/0281960 | A1* | 11/2012 | Boncha | H04N 21/4147 |
| | | | | 386/224 |
| 2013/0229482 | A1* | 9/2013 | Vilcovsky | G02B 5/08 |
| | | | | 348/14.07 |
| 2013/0260893 | A1 | 10/2013 | Shin et al. | |
| 2013/0332543 | A1 | 12/2013 | Shin et al. | |
| 2013/0336632 | A1* | 12/2013 | Watanabe | H04N 13/189 |
| | | | | 386/241 |
| 2014/0019540 | A1 | 1/2014 | Shin et al. | |
| 2015/0020135 | A1* | 1/2015 | Frusina | H04N 21/2405 |
| | | | | 725/116 |
| 2015/0142925 | A1* | 5/2015 | Hix | H04L 65/60 |
| | | | | 709/219 |
| 2015/0304601 | A1* | 10/2015 | Hicks | H04N 5/77 |
| | | | | 386/224 |
| 2015/0318020 | A1* | 11/2015 | Pribula | H04N 21/42225 |
| | | | | 386/227 |
| 2016/0026874 | A1* | 1/2016 | Hodulik | H04N 21/8549 |
| | | | | 386/281 |
| 2016/0112652 | A1* | 4/2016 | David | H04N 5/2628 |
| | | | | 348/239 |
| 2016/0269648 | A1* | 9/2016 | Hayashi | H04N 5/23206 |
| 2016/0366330 | A1* | 12/2016 | Boliek | G06F 16/7867 |
| 2017/0076571 | A1* | 3/2017 | Borel | G08B 13/19673 |
| 2017/0243373 | A1* | 8/2017 | Bevensee | H04N 7/22 |
| 2017/0244897 | A1* | 8/2017 | Jung | H04N 19/426 |
| 2018/0035137 | A1* | 2/2018 | Chen | H04N 21/2743 |
| 2018/0070009 | A1* | 3/2018 | Baek | H04N 5/23216 |
| 2019/0080721 | A1* | 3/2019 | Fay | H04N 21/23406 |
| 2019/0364211 | A1* | 11/2019 | Chun | H04N 21/8456 |
| 2020/0382723 | A1* | 12/2020 | Pena | G06F 3/0485 |

FOREIGN PATENT DOCUMENTS

| | | |
|---|---|---|
| JP | 2016-123032 A | 7/2016 |
| KR | 2009-0046812 A | 5/2009 |
| WO | WO-2015/065001 A1 | 5/2015 |

OTHER PUBLICATIONS

Korean Office Action for corresponding Korean Application No. 10-2016-0102939 dated Feb. 28, 2018.

Office Action dated Jul. 6, 2021, for corresponding Japanese Patent Application No. 2017-154441.

* cited by examiner

Preview recording instruction

METHOD AND SYSTEM FOR VIDEO RECORDING

CROSS-REFERENCE TO RELATED APPLICATIONS

This application is a Continuation of U.S. application Ser. No. 15/668,024, filed on Aug. 3, 2017, which claims priority under 35 U.S.C. § 119 to Korean Patent Application No. 10-2016-0102939 filed on Aug. 12, 2016, in the Korean Intellectual Property Office (KIPO), the entire contents of which are incorporated herein by reference.

BACKGROUND

Field

One or more example embodiments relate to video recording methods and systems, and more particularly, to video recording methods for recording a playable video by applying a real-time time-fake effect, a non-transitory computer-readable storage medium storing a computer program to perform the video recording methods in an electronic device, and a file distribution system for distributing an installation file for installing the computer program in the electronic device.

Description of Related Art

Camera modules are mounted to a variety of electronic devices, such as smartphones and tablets that use the camera modules to perform the function of photographing an image or a video.

Once a user of an electronic device enters an image photographing mode using a camera included in the electronic device, the electronic device displays a preview image input through the camera on a screen. Here, in conventional electronic devices, once the user inputs a video photographing instruction, the electronic device encodes an image captured in response to the video photographing instruction and creates a video file of a set video format, for example, MPEG-4 Part 14 (MP4).

However, video formats have been developed to enhance the compression of the video. Thus, a particular frame may not be readily extracted. For example, storing an original version of a captured image may significantly increase the volume of the image, which may be inefficient. In conventional video formats, compression efficiency may be enhanced by, for example, setting a key frame every set unit time and by extracting and storing only modifications of frames subsequently connected to the key frame. Here, the key frame indicates a frame that is designated not to compress a video, and stores an original image of a frame at all times. In general, a time unit for storing a key frame may be set between 1 and 5 seconds. If a video is stored by setting a time unit as one second in a video for processing 24 frames per second, about 23 frames may be compressed during 1 second. For example, Korean Published Patent No. 10-2009-0046812 relates to a video compression method and discloses an MPEG video compression standard.

That is, video formats are designed for playing a video forward. Thus, it may be difficult to readily seek, extract, and control particular frames. For example, it may be difficult to apply a time-fake effect, such as increasing or decreasing a play rate of frames, changing a play order of frames from forward to backward, and the like.

An operation of transcoding each video for each time-fake effect is used to readily extract and control frames. Since three times the video running time is used to perform the above operation, the usability and the capability of the video may be decreased, which may lead to degrading a quality of service (QoS).

Reference materials may include, for example, PCT/KR/2014/010167, US20140019540A1, US20130332543A1, and US20130260893.

SUMMARY

One or more example embodiments provide video recording methods and systems for readily seeking, extracting, and controlling frames by capturing a preview image, using a camera included in the electronic device, based on a set frame rate and in response to the electronic device entering an image photographing mode. The video recording methods may further include storing the captured preview image. The video recording methods may further include applying at least one time-fake effect among a plurality of set time-fake effects to the stored preview image. Furthermore, the video recording methods may include creating a video file of a set format by encoding the preview image after the applying the at least one time-fake effect.

One or more example embodiments also provide a video recording method and system for additionally recording and using an image of a situation ahead a situation in which a user inputs a recording instruction, and a non-transitory computer-readable recording medium storing a computer program to perform the video recording method in an electronic device.

According to at least one example embodiment, there is provided a non-transitory computer-readable storage medium storing instructions that, when executed by a processor, cause the processor to perform a video recording method in an electronic device, the video recording method including capturing a preview image, using a camera included in the electronic device, based on a set frame rate and in response to the electronic device entering an image photographing mode. The video recording method may further include storing the captured preview image. The video recording method may further include applying at least one time-fake effect among a plurality of set time-fake effects to the stored preview image. Furthermore, the video recording method may include creating a video file of a set format by encoding the preview image after the applying the at least one time-fake effect.

According to at least one example embodiment, there is provided a video recording method of an electronic device, the method including capturing a preview image, using a camera included in the electronic device, based on a set frame rate and in response to the electronic device entering an image photographing mode. The method may further include storing the captured preview image. The method may further include applying at least one time-fake effect among a plurality of set time-fake effects to the stored preview image. Furthermore, the method may include creating a video file of a set format by encoding the preview image after the applying the at least one time-fake effect.

According to at least one example embodiment, there is provided a file distribution method of a file distribution server, the method including storing an installation file for installing a computer program in an electronic device. The method further includes receiving a request for the installation file from the electronic device over a network. Furthermore, the method includes transmitting the requested installation file to the electronic device over the network. The computer program includes a first module configured to control the electronic device to capture a preview image, using a camera included in the electronic device based, on a set frame rate and in response to the electronic device entering an image photographing mode. Further, the computer program includes a second module configured to control the electronic device to store the captured preview image. Further, the computer program includes a third module configured to control the electronic device to apply at least one time-fake effect among a plurality of set time-fake effects to the stored preview image. Furthermore, the computer program includes a fourth module configured to control the electronic device to create a video file of a set format by encoding the preview image after the at least one time-fake effect is applied.

According to some example embodiments, it is possible to readily seek, extract, and control frames by capturing a preview image input through a camera included in an electronic device, by storing the captured preview image, by applying a time-fake effect to the stored preview image, and by creating a video file of a set format.

According to some example embodiments, it is possible to additionally record and use an image of a situation ahead a situation in which a user inputs a recording instruction.

Further areas of applicability will become apparent from the description provided herein. The description and specific examples in this summary are intended for purposes of illustration only and are not intended to limit the scope of the present disclosure.

BRIEF DESCRIPTION OF THE FIGURES

Some example embodiments will be described in more detail with regard to the figures, wherein like reference numerals refer to like parts throughout the various figures unless otherwise specified, and wherein.

Figure 1:
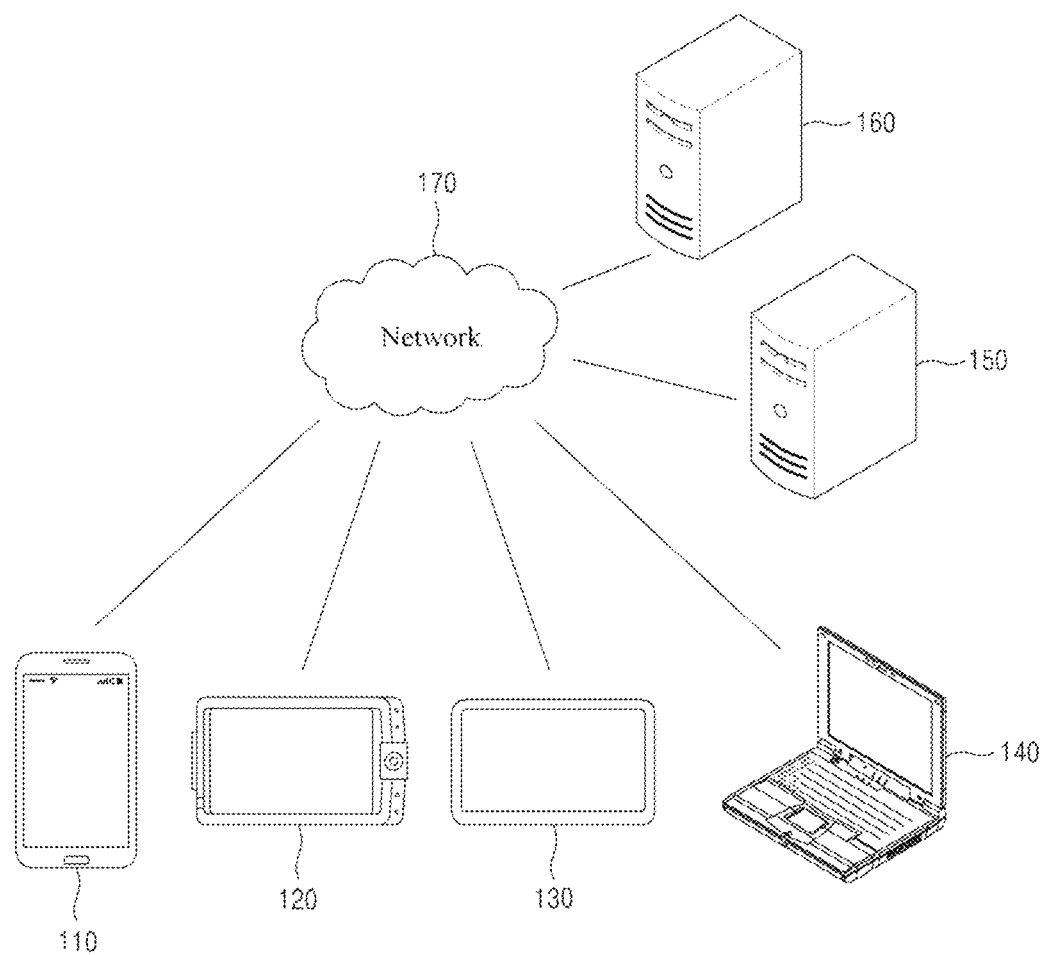
FIG. 1 is a diagram illustrating a network environment according to at least some example embodiments.

It should be noted that these figures are intended to illustrate the general characteristics of methods and/or structure utilized in some example embodiments and to supplement the written description provided below. These drawings are not, however, to scale and may not precisely reflect the precise structural or performance characteristics of any given example embodiment, and should not be interpreted as defining or limiting the range of values or properties encompassed by some example embodiments.

DETAILED DESCRIPTION

One or more example embodiments will be described in detail with reference to the accompanying drawings. Some example embodiments, however, may be embodied in various different forms, and should not be construed as being limited to only the illustrated example embodiments. Rather, the illustrated example embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "includes", "including", "included", "include", "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed contemporaneously, or in some cases be performed in reverse order.

Units, components and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units, components and/or devices according to one or more example embodiments may also include one or more storage devices. The one or more storage devices may be tangible or non-transitory computer-readable storage media, such as random access memory (RAM), read only memory (ROM), a permanent (e.g., non-volatile) mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing some example embodiments described herein. The computer programs, program code, instructions, or some combination thereof, may also be loaded from a separate computer readable storage medium into the one or more storage devices and/or one or more computer processing devices using a drive mechanism. Such a separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for use in some example embodiments, or they may be known devices that are altered and/or modified for the use in some example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be described as being embodied by as one computer processing device; however, one skilled in the art will appreciate that a hardware device may include multiple processing elements and multiple types of processing elements. For example, a hardware device may include multiple processors (e.g., a multiprocessor system) or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

A video recording system according to some example embodiments may be configured through an electronic device to be described in the following, and a video recording method according to some example embodiments may be performed by the electronic device. For example, an application configured as a computer program may be installed and executed and the electronic device may perform the video recording method under control of the executed application. The computer program may be stored on a non-transitory computer-readable storage medium to perform the video recording method in the electronic device. Also, a file distribution system to distribute an installation file for installing the computer program in the electronic device may be configured through a server to be described in the following. The file distribution method may be performed through the server.

FIG. 1 is a diagram illustrating a network environment according to at least some example embodiments. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a personal computer (PC), a laptop computer, a digital broadcasting terminal, a personal digital assistant (PDA), a portable multimedia player (PMP), a tablet (PC), a game console, a wearable device, an augmented reality and/or virtual reality device, and Internet of things device, and the like. Although FIG. 1 illustrates a smartphone as an example of the electronic device 110, it is provided as an example only. In some example embodiments, the electronic device 110 may indicate one of various devices that may communicate with other electronic devices 120, 130, and/or 140, and/or the servers 150 and/or 160 over the network 170 in a wired communication manner or in a wireless communication manner.

The communication scheme is not particularly limited and may include a communication method that uses near field communication between devices as well as a communication method using a communication network, for example, a mobile communication network, the wired Internet, the wireless Internet, and a broadcasting network, which may be included in the network 170. For example, the network 170 may include at least one of several network topologies that include networks, such as, a personal area network (PAN), a local area network (LAN), a campus area network (CAN), a metropolitan area network (MAN), a wide area network (WAN), a broadband network (BBN), the Internet, and the like. Also, the network 170 may include at least one of several network topologies that include a bus network, a star network, a ring network, a mesh network, a star-bus network, a tree or hierarchical network, and the like. However, these are only examples and some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and/or 140 over the network 170. For example, the server 150 may provide a first service to the plurality of electronic devices 110, 120, 130, and 140 connected through the network 170, and the server 160 may provide a second service to the plurality of electronic devices 110, 120, 130, and 140 connected through the network 170. In detail, the server 150 may provide an installation file for installing an application, for example, a computer program as the first service to the plurality of electronic devices 110, 120, 130, and 140. Also, the server 160 may provide the second service for a game linked with the application or a social network service (SNS), content streaming, video recording, video editing, and the like, to the plurality of electronic devices 110, 120, 130, and 140 that installs the application through the installation file and executes the installed application.

Figure 2:
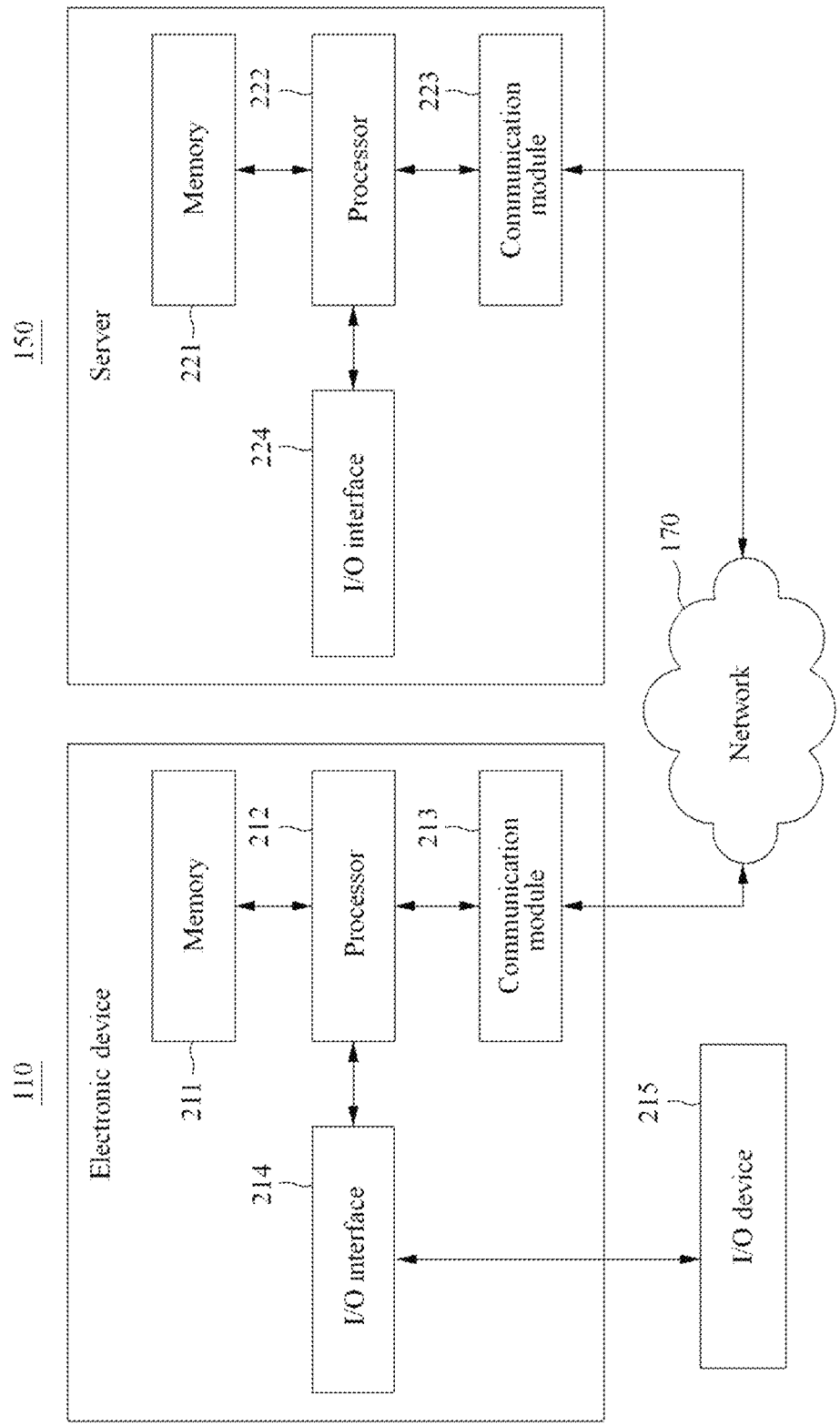
FIG. 2 is a block diagram illustrating a configuration of an electronic device and a server according to at least some example embodiments.

FIG. 2 is a block diagram illustrating a configuration of an electronic device and a server according to at least some example embodiments. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, at least one processor 212, a communication module 213, an input/output (I/O) interface 214, etc., and the server 150 may include a memory 221, at least one processor 222, a communication module 223, an I/O interface 224, etc. The memory 211 and/or memory 221 may include random access memory (RAM) and/or a permanent mass storage device, such as, read only memory (ROM), a magnetic or optical disk drive, a non-volatile solid state drive, etc., as a computer-readable storage medium. Here, a permanent mass storage device such as ROM and/or a disk drive may be included in the electronic device 110 or the server 150 as a separate permanent storage device separate from the memory 211 and/or memory 221. Also, an OS and at least one program code, for example, a code for an application installed on the electronic device 110 to provide a specific service, a browser installed and executed on the electronic device 110, etc., may be stored in the memory 211 and/or memory 221. Such software components may be loaded from another computer-readable storage medium separate from the memory 211 and/or memory 221 using a drive mechanism. The other computer-readable storage medium may include, for example, a floppy drive, a disk, a tape, a DVD/CD-ROM/Blu-ray drive, a memory card, etc. According to some example embodiments, software components may be loaded to the memory 211 and/or memory 221 through the communication module 213 and/or communication module 223, instead of, or in addition to, the computer-readable storage medium. For example, at least one program may be loaded to the memory 211 and/or memory 221 based on a program, for example, the application, installed by files provided over the network 170 from developers or a file distribution system, for example, the server 150, which provides an installation file of the application.

The processor 212 and/or processor 222 may be configured to process computer-readable instructions, for example, the aforementioned at least one program code, of a computer program by performing basic arithmetic operations, logic operations, and I/O operations. The computer-readable instructions may be provided from the memory 211 and/or memory 221 and/or the communication module 213 and/or communication module 223 to the processor 212 and/or processor 222. For example, the processor 212 processor 222 may be configured to execute received instructions in response to the program code stored in the storage device, such as the memory 211 and/or memory 222.

The communication module 213 and/or communication module 223 may be embodied, for example, by circuits or circuitry or, alternatively, at least one processor executing program code including instructions corresponding to any or all operations described herein as being performed by the communication module 213 and/or communication module 223. The communication module 213 communication module 223 may provide a function for communication between the electronic device 110 and the server 150 over the network 170, and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the aforementioned permanent storage device, further includable in the electronic device 110.

The I/O interface 214 may be a device (e.g., a circuit and/or at least one processor executing firmware) used for interface with an I/O device 215. According to at least some example embodiments, the I/O device 215 is, or includes, an input device and/or an output device. For example, an input device may include, but is not limited to, a keyboard, a mouse, a touch panel, a microphone, a camera, etc., and an output device may include, but is not limited to, a device, such as a display (e.g., a touch screen, liquid crystal display (LCD)). As another example, the I/O interface 214 may be a device for interface with an apparatus in which an input function and an output function are integrated into a single function, such as a touch screen. The I/O device 215 may be configured as a single device with the electronic device 110. Also, the I/O interface 224 of the server 150 may be a device (e.g., a circuit and/or at least one processor executing firmware) for interface with a device (not shown) for input or output that may be connected to the server 150 or included in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to some example embodiments, the electronic device 110 and the server 150 may include a greater or lesser number of components than the number of components shown in FIG. 2. For example, the electronic device 110 may include at least a portion of the I/O device 215, or may further include other components, for example, a transceiver, a global positioning system (GPS) module, a camera, a variety of sensors, a database, and the like. In detail, if the electronic device 110 is a smartphone, the electronic device 110 may be configured to further include a variety of components, for example, an accelerometer sensor, a gyro sensor, a camera, various physical buttons, a button using a touch panel, an I/O port, a vibration motor for vibration, etc., which are generally included in the smartphone.

Figure 3:
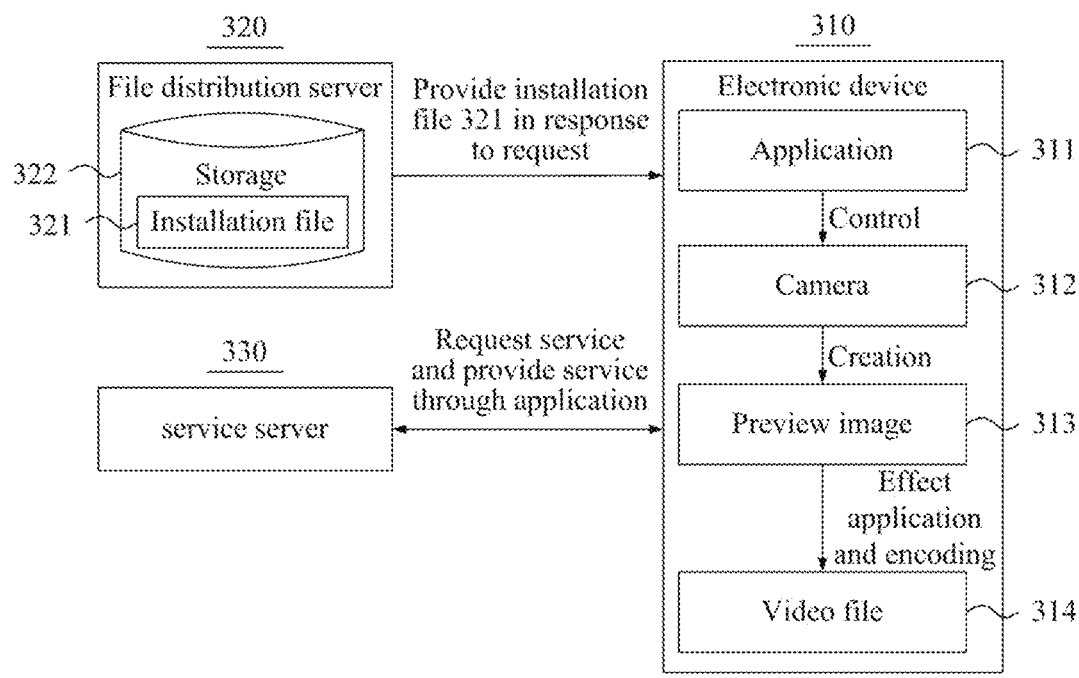
FIG. 3 is a diagram illustrating a system for recording a video according to at least some example embodiments.

FIG. 3 is a diagram illustrating an entire system for recording a video according to at least some example embodiments. FIG. 3 illustrates an electronic device 310, a file distribution server 320, and a service server 330. The electronic device 310 may correspond to the electronic device 110, and the file distribution server 320 and the service server 330 may correspond to the server 150 and the server 160, respectively.

The file distribution server 320 may store and manage, in a storage 322 (e.g., memory 221), an installation file 321 for installing an application 311 corresponding to a computer program in the electronic device 310, and may receive a request for the installation file 321 from the electronic device 310 connected through the network 170. Here, the file distribution server 320 may transmit the requested installation file 321 to the electronic device 310 through the network 170. The file distribution server 320 may be a system of a developer that distributes the application 311 or a system of an app store that provides installation files of various applications for payment or free. For example, installation files for the respective various applications may be stored and managed in the storage 322, and the file distribution server 320 may provide download pages for the respective various applications to the electronic device 310. Here, a download page of the application 311 may include a link for requesting the installation file 321. In response to a selection on the link at the electronic device 310, for example, in response to a user of the electronic device 310 touching a link displayed on a touch screen of the electronic device 310 in a touch screen environment, the installation file 321 of the application 311 may be requested to the file distribution server 320. The file distribution server 320 may retrieve the requested installation file 321 from the storage 322 and may transmit the installation file 321 to the electronic device 310 through the network 170. According to some example embodiments, operations described herein as being performed by the file distribution server 320 may be performed by at least one processor (e.g., the processor 222) executing program code that includes instructions corresponding to the operations. The instructions may be stored in a memory of the file distribution server 320 (e.g., the storage 322). The term 'processor', as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

The electronic device 310 may install the application 311 in the electronic device 310 as the computer program using the installation file 321 received from the file distribution server 320. The application 311 may control the electronic device 310 to perform the video recording method according to some example embodiments. Here, the electronic device 310 may receive data, instruction, and the like through a connection to the service server 330 using the application 311.

The electronic device 310 may include a camera 312 configured as a hardware module. The application 311 may further control the camera 312 to perform the video recording method. The electronic device 310 may create a video file 314 by capturing a preview image 313, input and created through the camera 312 under control of the application 311, by applying and encoding a time-fake effect to the captured preview image 313. As described above, it may be difficult to readily seek, extract, and control frames from the video file 314 of a conventional format, such as an MP4 format. On the contrary, it may be possible to readily seek, extract, and control frames from the captured preview image 313. Thus, the electronic device 310 may easily apply various time-fake effects to the preview image 313 under control of the application 311. According to some example embodiments, operations described herein as being performed by the electronic device 310 may be performed by at least one processor (e.g., the processor 212) executing program code that includes instructions corresponding to the operations (e.g., application 311). The instructions may be stored in a memory of the electronic device 310 (e.g., the memory 211).

Figure 4:
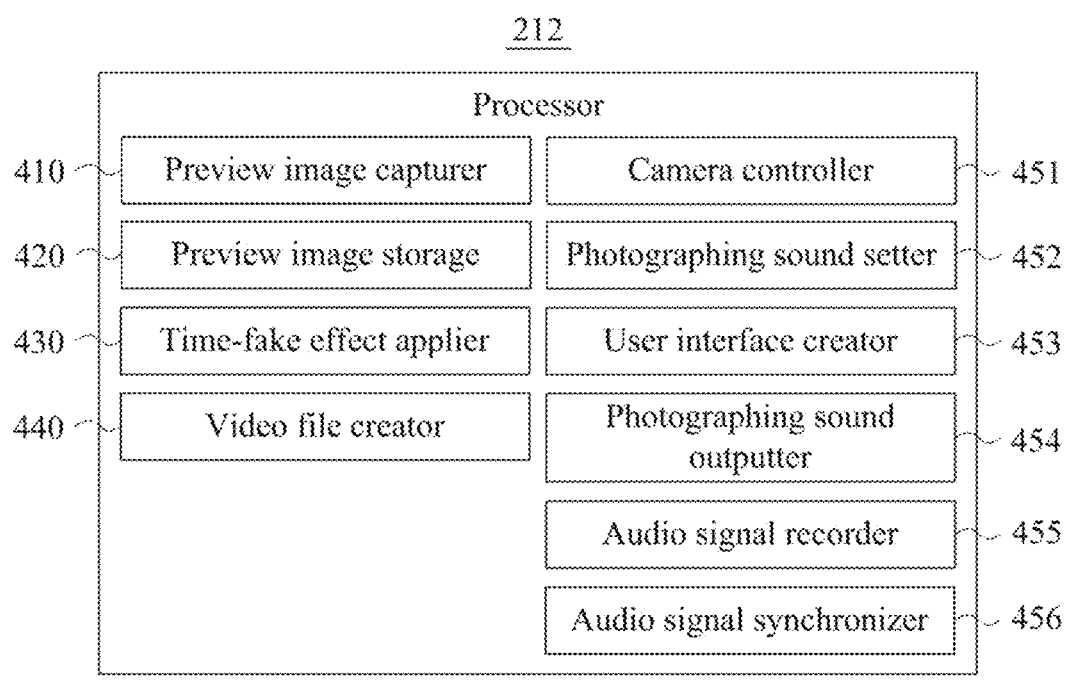
FIG. 4 is a diagram illustrating components included in a processor of an electronic device according to at least some example embodiments.
Figure 5:
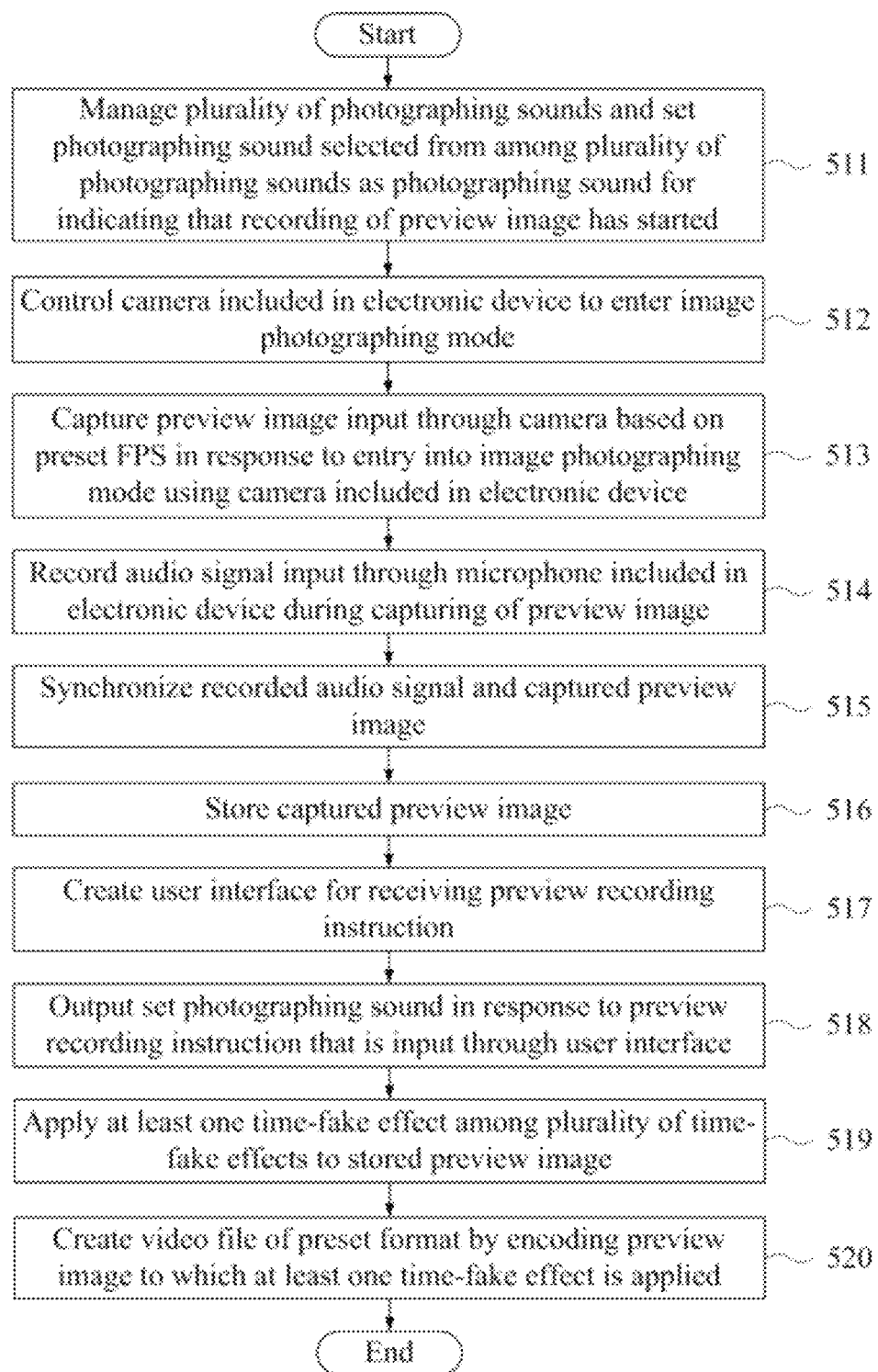
FIG. 5 is a flowchart illustrating a method performed by an electronic device according to at least some example embodiments.

FIG. 4 is a diagram illustrating components included in a processor of an electronic device according to at least some example embodiments, and FIG. 5 is a flowchart illustrating a method performed by an electronic device according to at least some example embodiments.

As described above with FIG. 3, the electronic device 110 may correspond to the electronic device 310 configured to perform the video recording method under control of an application. Referring to FIG. 4, the processor 212 of the electronic device 110 may include a preview image capturer 410, a preview image storage 420, a time-fake effect applier 430, and a video file creator 440, and may further include at least one of a camera controller 451, a photographing sound setter 452, a user interface creator 453, a photographing sound outputter 454, an audio signal recorder 455, and an audio signal synchronizer 456 according to some example embodiments. According to at least some example embodiments, operations described herein as being performed by any or all of the preview image capturer 410, the preview image storage 420, the time-fake effect applier 430, the video file creator 440, the camera controller 451, the photographing sound setter 452, the user interface creator 453, the photographing sound outputter 454, the audio signal recorder 455, and the audio signal synchronizer 456 may be performed by at least one processor (e.g., the processor 212) executing program code that includes instructions corresponding to the operations. The instructions may be stored in a memory of the electronic device 110 (e.g., the memory 211). The processor 212 and the components of the processor 212 may perform operations 511 through 520 included in the video recording method of FIG. 5. Here, the processor 212 and the components of the processor 212 may be configured to execute an instruction according to a code of the OS included in the memory 211 or a code of at least one program, for example, the application 311. Here, the components of the processor 212 may be representations of different functions of the processor 212 performed by the processor 212 in response to a control instruction provided from a code stored in the electronic device 110. For example, the preview image capturer 410 may be used as a functional representation of the processor 212 that controls the electronic device 110 to capture a preview image in response to the control instruction.

Referring to FIG. 5, in operation 511, the photographing sound setter 452 may manage a plurality of photographing sounds and may set a photographing sound selected from among the plurality of photographing sounds as indicating that recording of a preview image has started. Each preview image may include one or more frames. In the case of recording a video using a native application programming interface (API) through a media recorder, a set photographing sound may be configured and may not be removed. On the contrary, in some example embodiments, a preview image may be acquired by capturing the preview image using an API of a camera instead of using the native API. Thus, the photographing sound may be configurable by the photographing sound setter 452. Accordingly, in some example embodiments, a separate photographing sound may be set and used to indicate that recording of a preview image has started. To this end, the photographing sound setter 452 may manage a plurality of photographing sounds and may set a photographing sound selected from among the plurality of photographing sounds as indicating that recording of a preview image has started. Here, the photographing sound setter 452 may provide a list of the managed photographing sounds to the user of the electronic device 110, and may set a photographing sound selected by the user as a separate photographing sound indicating that recording of the preview image has started.

In operation 512, the camera controller 451 may control a camera included in the electronic device 110 to enter an image photographing mode. A method of controlling a camera included in a smartphone, a tablet, and the like, would be understood by one of ordinary skill in the art. Accordingly, a further description is omitted here.

In operation 513, the preview image capturer 410 may capture a preview image input through the camera based on a set frame per second (FPS) frame rate in response to entry into an image photographing mode using the camera included in the electronic device 110. For example, an upper limit frame rate supported for a preview may vary based on hardware. The preview image capturer 410 may capture a preview image based on an upper limit frame rate, for example, 24 FPS, supportable based on hardware of the electronic device 110. Capturing of the preview image may be performed using an API corresponding to the camera. In detail, the preview image may be captured using "OnPreviewFrame callback" that is an API for capturing a camera preview screen in an Android system corresponding to a mobile phone platform, such as a smart phone.

In operation 514 the audio signal recorder 455 may record an audio signal input through a microphone included in the electronic device 110 during capturing of the preview image. A general video photographing function using a native API through a media recorder may store an image and audio signal at the same time. In some example embodiments, since the preview image may be captured and used, the audio signal may be acquired through a separate recording process.

In operation 515, the audio signal synchronizer 456 may synchronize the recorded audio signal and the captured preview image. Synchronization between the audio signal and the image may be performed through a known synchronization method. For example, the audio signal and the preview image may be synchronized based on a point in time at which the preview image is captured and a point in time at which the audio signal is input.

In operation 516, the preview image storage 420 may store the captured preview image. For example, the captured preview image may be stored in a YUV format. Here, the preview image storage 420 may store each of a preview image of a first size captured before a point in time at which a set preview recording instruction is input (also, referred to as an input point in time of a set preview recording instruction) and a preview image of a second size captured after the point in time at which the preview recording instruction is input.

For example, the preview image storage 420 may create a first buffer of the first size and may store the captured preview image in the created first buffer until the preview recording instruction is input. Here, if a size of the captured preview image exceeds the first size, the preview image storage 420 may delete relatively previously captured frames from the first buffer and thereby store the preview image of the first size in the first buffer. According to some example embodiments, the first buffer may be a first-in-first-out (FIFO) buffer. Also, the preview image storage 420 may create a second buffer of the second size or more and may store, in the second buffer, a preview image captured during a set period of time from the input point in time of the preview recording instruction. Accordingly, an image of a situation before the preview recording instruction is input from the user may be acquired and used. Storing of the preview image will be further described.

In operation 517, the user interface creator 453 may create a user interface for receiving the preview recording instruction. In some example embodiments, dissimilar to a general video photographing function using a native API through a media recorder, an instruction for recording a preview image is received from a user. Thus, a separate user interface may be created and provided. Also, since a preview image captured ahead an input point in time of the preview recording instruction is also stored, the user interface may be created during a process of capturing and storing the preview image.

In operation 518, in response to the preview recording instruction that is input through the user interface, the photographing sound outputter 454 may output the set photographing sound. Setting of the photographing sound is described through operation 511 and the set photographing sound may be output in response to the preview recording instruction. Accordingly, various types of photographing sounds may be selected and used by the user. According to some example embodiments, the user may directly store a desired sound source in the electronic device 110 and may use the same as the photographing sound.

In operation 519, the time-fake effect applier 430 may apply at least one time-fake effect among a plurality of time-fake effects to the stored preview image. For example, the time-fake effect applier 430 may change at least one of a play rate and a play order of at least a portion of frames included in the stored preview image based on at least one time-fake effect and may apply the time-fake effect to the preview image. In detail, the time-fake effects may include a first effect of reversing a display order of at least a portion of frames included in the stored preview image. Also, the time-fake effect applier 430 may further include at least one effect among a second effect of increasing a display rate of at least a portion of the frames, a third effect of decreasing a display rate of at least a portion of the frames, a fourth effect in which the first effect and the second effect are coupled, and a fifth effect in which the first effect and the third effect are coupled.

As described above, according to some example embodiments, since it is difficult to readily seek, extract, and control video files of a conventional format, it may be desirable to capture and use a preview image. Since the preview image stores original frames to which video format compression is not performed, it is possible to readily seek, extract, and control desired frames. That is, the time-fake effect applier 430 may apply at least one of various time-fake effects using original frames to which compression is not applied.

In operation 520, the video file creator 440 may create a video file of a set format by encoding the preview image to which the at least one time-fake effect is applied. The video file may be played through a general media player that supports a corresponding format. For example, the created video file may be uploaded to the service server 330 and provided to the other users through a variety of schemes, and may be used as contents of an SNS.

As an example of applying a time-fake effect, the time-fake effect applier 430 may create and provide a plurality of images to which different time-fake effects are applied, respectively, using the stored preview image. In this case, the video file creator 440 may create a video file by encoding an image selected from among the plurality of provided images. For example, the electronic device 110 may create various types of images to which different various time-fake effects are applied, respectively, and may provide each of the created images to the user and may create the image selected by the user as a video file.

According to some example embodiments of applying a time-fake effect, the time-fake effect applier 430 may create a user interface for selecting at least one time-fake effect from among the plurality of time-fake effects and may apply the time-fake effect selected through the user interface to the stored preview image. In this case, the video file creator 440 may create a video file by encoding the preview image to which the selected time-fake effect is applied.

Figure 6:
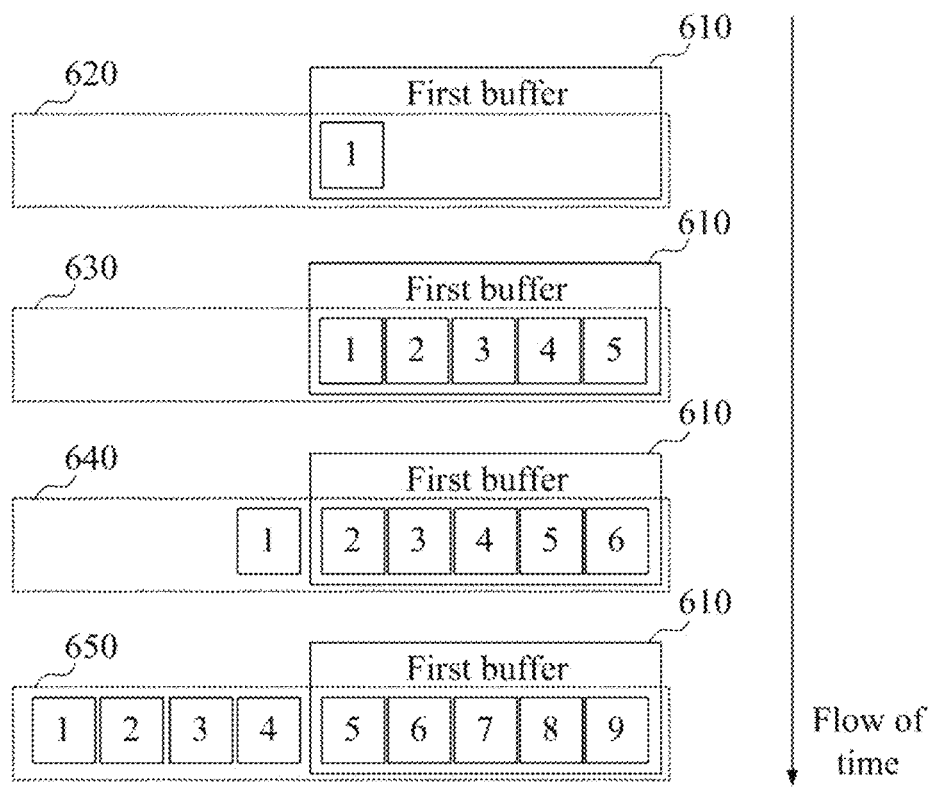
FIG. 6 illustrates a method of storing a captured preview image in a first buffer according to at least some example embodiments.

FIG. 6 illustrates a method of storing a captured preview image in a first buffer according to at least some example embodiments. For example, in the case of supporting a frame rate of 24 FPS, 24 frames may be created per second. A buffer with a size corresponding to 1 second may store 24 frames. Herein, for clarity of description, an example in which a preview image captured before a preview recording instruction is input is stored through a first buffer 610 capable of storing five frames is described with reference to FIG. 6.

A first box 620 indicated with dotted lines represents an example in which a first frame created through capturing of a preview image is stored in the first buffer 610. A second box 630 indicated with dotted lines represents an example in which five frames created through capturing of a preview image are stored in the first buffer 610. Since it is assumed that the first buffer 610 may store five frames, in this example, the first buffer 610 is full.

A third box 640 indicated with dotted lines represents an example in which a relatively previously captured frame "1" is deleted from the first buffer 610 in response to capturing of a new frame "6" and the new frame "6" is stored in the first buffer 610. A fourth box 650 indicated with dotted lines represents an example in which the first buffer 610 stores most recently captured five consecutive frames (if less than five frames are captured, less than five consecutive frames) at all times through iteration of the above process.

Figure 7:
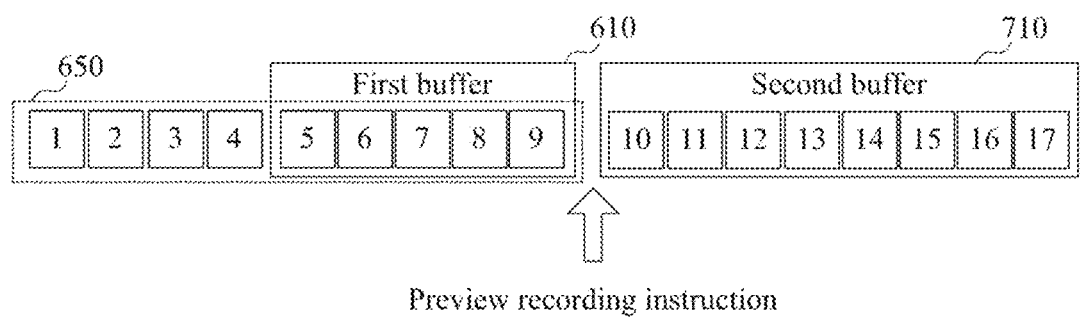
FIG. 7 illustrates a method of storing a captured preview image in a second buffer according to at least some example embodiments.

FIG. 7 illustrates a method of storing a captured preview image in a second buffer according to at least some example embodiments. Herein, for clarity of description, it is assumed that a second buffer 710 stores eight frames. When it is assumed that the second buffer 710 may have a size corresponding to 3 seconds or 10 seconds and a frame rate of 24 FPS is used, the second buffer 710 may store 72 (=24*3) to 240 (=24*10) frames. Also, as shown in the fourth box 650 (further described in association with FIG. 6), it is assumed that a preview recording instruction is input after a frame "9" is stored in the first buffer 610.

Here, referring to FIG. 7, frames, for example, frames "10 to 17" that are captured after the preview recording instruction is input may be stored in the second buffer 710. Once the second buffer 710 becomes full, capturing of a preview image is terminated. As described above, if a buffer has a size corresponding to 3 seconds based on a frame rate of 24 FPS, the buffer may store 72 frames. If a buffer has a size corresponding to 10 seconds based on a frame rate of 24 FPS, the buffer may store 240 frames.

The stored frames are original frames that are not compressed, as is commonly performed when creating a conventional video using a camera. Thus, it is possible to readily seek, extract, and control a desired frame.

Figure 8:
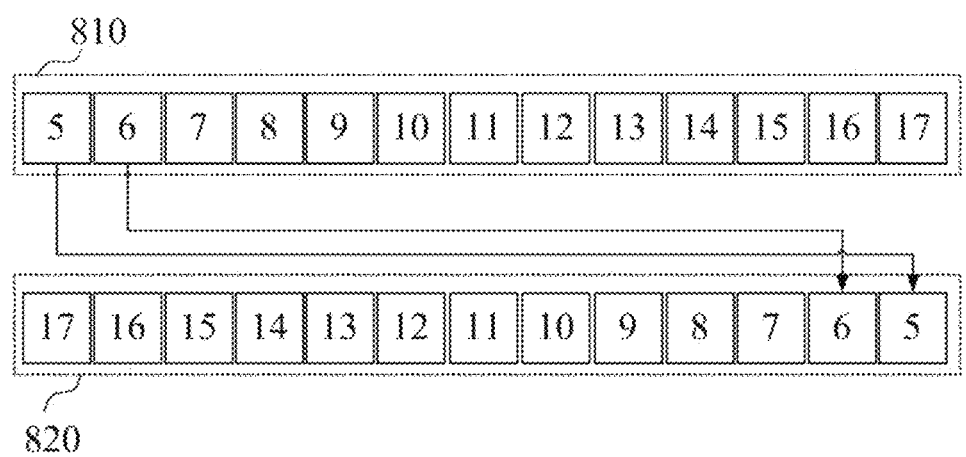
FIG. 8 illustrates changing a play order of frames according to at least some example embodiments.

FIG. 8 illustrates changing a play order of frames according to at least some example embodiments. Referring to FIG. 8, a first box 810 indicated with dotted lines represents the frames 5 to 17 that are stored in the first buffer 610 and the second buffer 710 of FIG. 7. Since the frames may be easily sought and extracted, the electronic device 110 may readily control the frames and may apply a variety of time-fake effects. For example, a second box 820 indicated with dotted lines represents an example in which the frames 5 to 17 of the first box 810 are aligned in reverse order. In this case, it is possible to achieve a time-fake effect of playing a video in reverse order.

Also, the electronic device 110 may acquire a time-fake effect, for example, a slow motion or a relatively quick play, by changing a play rate of frames. For example, the electronic device 110 may select consecutive frames and then may increase a play rate from 24 FPS to 30 FPS through a header of the selected frames and may store the increased play rate. In this case, the frames may be quickly played. If the play rate is decreased from 24 FPS to 12 FPS, a slow motion effect may be acquired. That is, a play rate of only a portion of the entire frames may be changed to decrease or increase.

Figure 9:
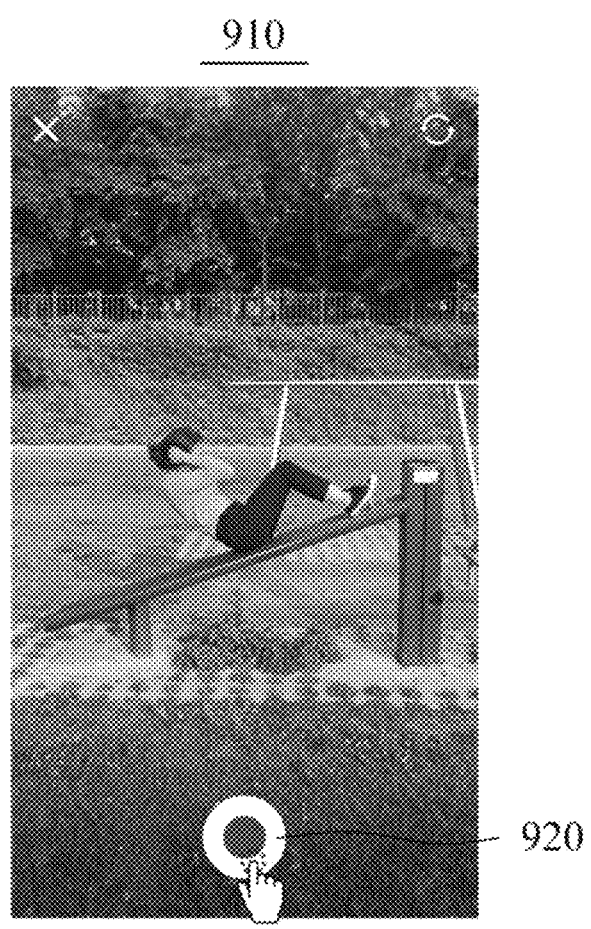
FIG. 9 illustrates a preview screen according to at least some example embodiments.

FIG. 9 illustrates a preview screen according to at least some example embodiments. FIG. 9 shows a screen 910 of the electronic device 110 on which a preview image input through a camera is displayed. Here, recent images of a determined size are continuously stored in the aforementioned first buffer 610 without a separate user manipulation. Also, a user interface 920 for an input of a preview recording instruction is displayed on the screen 910. Once a user selects the user interface 920, for example, once the user touches an area on which the user interface 920 is displayed in a touch screen environment, the preview recording instruction may be input and in response thereto, a preview image of a second size may be stored in the aforementioned second buffer 710.

Figure 10:
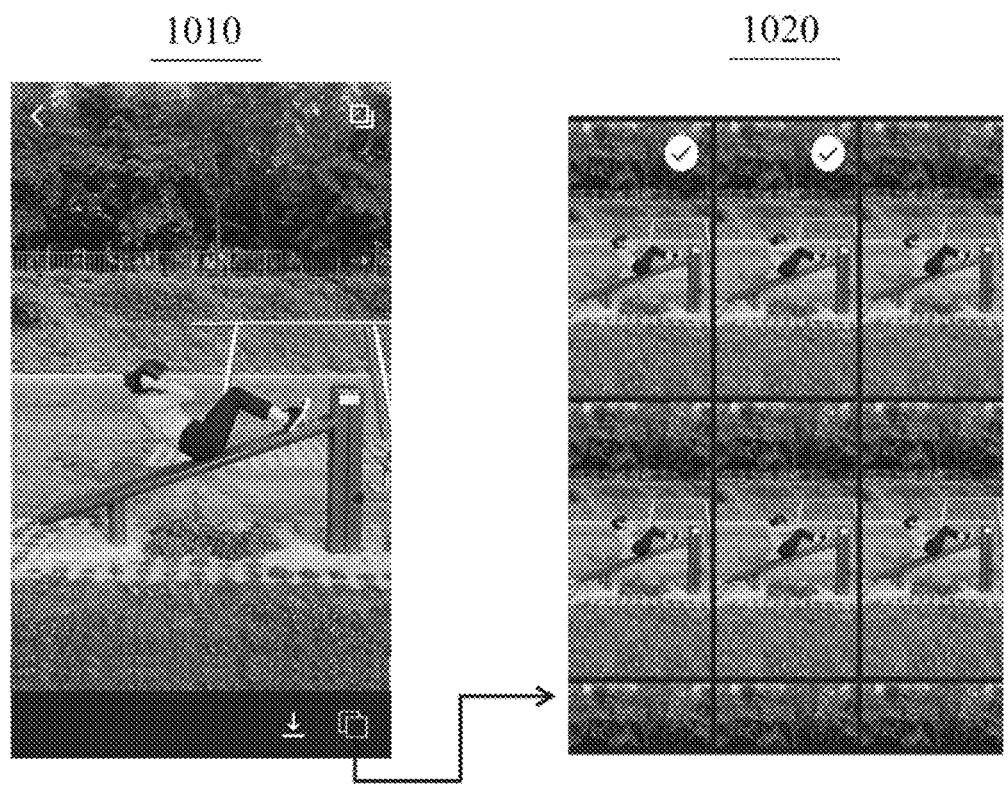
FIG. 10 illustrates a stored preview image and frames included in a preview image according to at least some example embodiments.

FIG. 10 illustrates a stored preview image and frames included in a preview image according to at least some example embodiments. FIG. 10 shows a first screen 1010 on which a single frame among preview images capturing during a set (or, alternatively, desired) period of time around a point in time at which a preview recording instruction is input. FIG. 10 shows a second screen 1020 on which frames of a preview image are verified. A user may control a preview image stored based on a frame unit, such as individually selecting frames and changing order of the selected frames, deleting a specific frame, applying a filter to a specific frame, and the like.

According to some example embodiments, it is possible to readily seek, extract, and control frames by capturing a preview image input through a camera included in an electronic device, by storing the captured preview image, by applying a time-fake effect to the stored preview image, and by creating a video file of a set format. Also, it is possible to additionally record and use an image of a situation before a user inputs a recording instruction.

The systems, devices, components and/or apparatuses described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to some example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks, Blu-ray and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the some example embodiments, or vice versa.

The foregoing description has been provided for purposes of illustration and description. It is not intended to be exhaustive or to limit the disclosure. Individual elements or features of particular example embodiments are generally not limited to those particular example embodiments, but, where applicable, are interchangeable and may be used in some example embodiments, even if not specifically shown or described. The same may also be varied in many ways. Such variations are not to be regarded as a departure from the disclosure, and all such modifications as would be obvious to one skilled in the art are intended to be included within the scope of the disclosure.

What is claimed is:

1. A non-transitory computer-readable storage medium storing instructions that, when executed by a processor, cause the processor to perform a video recording method in an electronic device, the video recording method comprising:

capturing a preview image using a camera included in the electronic device based on a set frame rate and in response to the electronic device entering an image photographing mode, wherein the preview image comprises a plurality of frames captured during a set period of time relative to when a set preview recording instruction is input through a user interface of the electronic device;

applying at least one time-fake effect to the preview image without the preview image having been compressed, the at least one time-fake effect changing at least one of a play rate or a play order of a portion of the plurality of frames included in an uncompressed version of the preview image; and creating a video file of a set format by encoding the uncompressed version of the preview image after the applying the at least one time-fake effect, wherein, the applying the at least one time-fake effect includes, receiving a selection for a selected time-fake effect from among a plurality of time-fake effects through the user interface, and applying the selected time-fake effect to the uncompressed version of the preview image, the applying the selected time-fake effect includes creating an image to which the selected time-fake effect is applied using the uncompressed version of the preview image;

the creating the video file of the set format includes encoding the video file by encoding the image to which the selected time-fake effect is applied; and the encoding the uncompressed version of the preview image includes compressing the uncompressed version of the preview image.

2. The non-transitory computer-readable storage medium of claim 1, wherein the video recording method further comprises:

storing one or more first frames among the portion of the plurality of frames captured before the set preview recording instruction is input, the one or more first frames having a first image size; and storing one or more second frames among the portion of the plurality of frames captured after the set preview recording instruction is input, the one or more second frames having a second image size.

3. The non-transitory computer-readable storage medium of claim 2, wherein the video recording method further comprises:

storing the uncompressed version of the preview image in a first buffer until the set preview recording instruction is input, the first buffer having a first buffer size; and deleting previously captured frames from the first buffer in response to newly captured frames causing a size of the uncompressed version of the preview image to exceed the first buffer size, such that the one or more first frames are stored in the first buffer.

4. The non-transitory computer-readable storage medium of claim 3, wherein the video recording method further comprises:

storing, in a second buffer, the one or more second frames captured during a set period of time after the set preview recording instruction is input, the second buffer having a second buffer size greater than or equal to the second image size.

5. The non-transitory computer-readable storage medium of claim 2, wherein the video recording method further comprises:

setting a photographing sound selected from among a plurality of photographing sounds as indicating that recording of the preview image has started;

receiving the set preview recording instruction input through the user interface; and outputting the set photographing sound in response to the receiving.

6. The non-transitory computer-readable storage medium of claim 1, wherein the at least one time-fake effect comprises:

a first effect of reversing a display order of the portion of the plurality of frames; and at least one effect among (i) a second effect of increasing a display rate of the portion of the plurality of frames, or (ii) a third effect of decreasing a display rate of the portion of the plurality of frames.

7. The non-transitory computer-readable storage medium of claim 1, wherein the video recording method further comprises:

recording an audio signal input through a microphone included in the electronic device during the capturing the preview image; and synchronizing the recorded audio signal with the captured preview image.

8. The non-transitory computer-readable storage medium of claim 1, wherein
the receiving receives a selection of one or more of the plurality of frames via the user interface while the user interface displays the plurality of frames; and
the applying the selected time-fake effect includes at least one of (i) changing a play order of the one or more of the plurality of frames based on the selection of the one or more frames, (ii) deleting the one or more of the plurality of frames based on the selection of the one or more frames, or (iii) applying a filter to one or more of the plurality of frames based on the selection of the one or more frames.

9. The non-transitory computer-readable storage medium of claim 1, wherein the video recording method further comprises:
displaying a screen including the plurality of frames after the input of the set preview recording instruction without the plurality of frames having been compressed.

10. A video recording method performed by an electronic device, the method comprising:
capturing a preview image using a camera included in the electronic device based on a set frame rate and in response to the electronic device entering an image photographing mode, wherein the preview image comprises a plurality of frames captured during a set period of time relative to when a set preview recording instruction is input through a user interface of the electronic device;
applying at least one time-fake effect to the preview image without the preview image having been compressed, the at least one time-fake effect changing at least one of a play rate or a play order of a portion of a plurality of frames included in an uncompressed version of the preview image; and
creating a video file of a set format by encoding the uncompressed version of the preview image after the applying the at least one time-fake effect,
wherein,
the applying the at least one time-fake effect includes, receiving a selection for a selected time-fake effect from among a plurality of time-fake effects through the user interface, and
applying the selected time-fake effect to the uncompressed version of the preview image,
the applying the selected time-fake effect includes creating an image to which the selected time-fake effect is applied using the uncompressed version of the preview image;
the creating the video file of the set format includes encoding the video file by encoding the image to which the selected time-fake effect is applied; and
the encoding the uncompressed version of the preview image includes compressing the uncompressed version of the preview image.

11. The method of claim 10, further comprising:
storing one or more first frames among the portion of the plurality of frames captured before the set preview recording instruction is input, the one or more first frames having a first image size; and
storing one or more second frames among the portion of the plurality of frames captured after the set preview recording instruction is input, the one or more second frames having a second image size.

12. The method of claim 11, further comprising:
storing the uncompressed version of the preview image in a first buffer until the set preview recording instruction is input, the first buffer having a first buffer size; and
deleting previously captured frames from the first buffer in response to newly captured frames causing a size of the uncompressed version of the preview image to exceed the first buffer size, such that the one or more first frames are stored in the first buffer.

13. The method of claim 12, further comprising:
storing, in a second buffer, the one or more second frames captured during a set period of time after the set preview recording instruction is input, the second buffer having a second buffer size greater than or equal to the second image size.

14. The method of claim 10, wherein the at least one time-fake effect comprises:
a first effect of reversing a display order of the portion of the plurality of frames; and
at least one effect among (i) a second effect of increasing a display rate of the portion of the plurality of frames, or (ii) a third effect of decreasing a display rate of the portion of the plurality of frames.

15. The method of claim 10, wherein
the user interface displays the plurality of frames;
the receiving receives a selection of one or more of the plurality of frames; and
the applying the selected time-fake effect includes at least one of (i) changing a play order of the one or more of the plurality of frames, (ii) deleting the one or more of the plurality of frames, or (iii) applying a filter to one or more of the plurality of frames.

16. A file distribution method performed by a file distribution server, the method comprising:
receiving a request for an installation file from an electronic device over a network, the installation file being configured to install a computer program; and
transmitting the requested installation file to the electronic device over the network, wherein the electronic device comprises a processor to execute instructions of the computer program,
wherein the computer program includes,
a first module configured to control the electronic device to capture a preview image using a camera included in the electronic device based on a set frame rate and in response to the electronic device entering an image photographing mode, wherein the preview image comprises a plurality of frames captured during a set period of time relative to when a set preview recording instruction is input through a user interface of the electronic device;
a second module configured to control the electronic device to apply at least one time-fake effect to the preview image without the preview image having been compressed, the at least one time-fake effect changing at least one of a play rate or a play order of a portion of a plurality of frames included in an uncompressed version of the preview image; and
a third module configured to control the electronic device to create a video file of a set format by encoding the uncompressed version of the preview image after the at least one time-fake effect is applied,
wherein,
the second module configured to control the electronic device to apply the at least one time-fake effect including, receiving a selection for a selected time-fake effect from among a plurality of time-fake effects through the user interface, and applying the selected time-fake effect to the uncompressed version of the preview image, the applying the selected time-fake effect includes creating an image to which the selected time-fake effect is applied using the uncompressed version of the preview image;

the third module configured to control the electronic device to create the video file of the set format including encoding the video file by encoding the image to which the selected time-fake effect is applied; and the encoding the uncompressed version of the preview image includes compressing the uncompressed version of the preview image.

17. The method of claim 16, wherein the computer program includes a fourth module configured to control the electronic device to:

store one or more first frames among the portion of the plurality of frames captured before a set preview recording instruction is input, the one or more first frames having a first image size; and store one or more second frames among the portion of the plurality of frames captured after the set preview recording instruction is input, the one or more second frames having a second image size.

18. The method of claim 17, wherein the fourth module is configured to control the electronic device to:

store the uncompressed version of the preview image in a first buffer until the set preview recording instruction is input, the first buffer having a first buffer size; and delete previously captured frames from the first buffer in response to newly captured frames causing a size of the uncompressed version of the preview image to exceed the first buffer size, such that the one or more first frames are stored in the first buffer.

19. The method of claim 18, wherein the fourth module is configured to control the electronic device to:

store, in a second buffer, the one or more second frames captured during a set period of time after the set preview recording instruction is input, the second buffer having a second buffer size greater than or equal to the second image size.

20. The method of claim 16, wherein the at least one time-fake effect comprises:

a first effect of reversing a display order of the portion of the plurality of frames; and at least one effect among (i) a second effect of increasing a display rate of the portion of the plurality of frames, or (ii) a third effect of decreasing a display rate of the portion of the plurality of frames.

21. The method of claim 16, wherein the user interface displays the plurality of frames;

the receiving receives a selection of one or more of the plurality of frames; and the applying the selected time-fake effect includes at least one of (i) changing a play order of the one or more of the plurality of frames, (ii) deleting the one or more of the plurality of frames, or (iii) applying a filter to one or more of the plurality of frames.

* * * * *